US 11,459,910 B2

(12) United States Patent
Feinstein et al.

(10) Patent No.: US 11,459,910 B2
(45) Date of Patent: Oct. 4, 2022

(54) DOUBLE WALL TUBES USING ADDITIVE MANUFACTURING

(71) Applicant: Rolls-Royce Corporation, Indianapolis, IN (US)

(72) Inventors: Daniel Feinstein, Zionsville, IN (US); Joseph Swift, Indianapolis, IN (US); Caleb Camara, Indianapolis, IN (US); Jared Taketa, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 17/074,310

(22) Filed: Oct. 19, 2020

(65) Prior Publication Data
US 2022/0120192 A1 Apr. 21, 2022

(51) Int. Cl.
*F01D 25/16* (2006.01)
*B33Y 80/00* (2015.01)

(52) U.S. Cl.
CPC ............ *F01D 25/164* (2013.01); *B33Y 80/00* (2014.12); *F05D 2260/96* (2013.01)

(58) Field of Classification Search
CPC .... F01D 25/164; B33Y 80/00; F05D 2260/96

USPC ......................................................... 415/119
See application file for complete search history.

(56) References Cited

U.S. PATENT DOCUMENTS

| 5,746,574 A * | 5/1998 | Czachor ................ F01D 25/243 |
| | | 415/176 |
| 6,438,938 B1 | 8/2002 | Burkholder et al. |
| 2018/0119575 A1 * | 5/2018 | Bouiller ................ F01D 25/183 |
| 2018/0223734 A1 * | 8/2018 | Hendrickson ......... F01D 25/162 |
| 2019/0113163 A1 * | 4/2019 | Godfrey ................ F01D 25/145 |

* cited by examiner

*Primary Examiner* — Yi-Kai Wang
(74) *Attorney, Agent, or Firm* — Shumaker & Sieffert, P.A.

(57) ABSTRACT

A strut may include an outer tube including an outer tube first end, an outer tube second end, and a longitudinal axis extending from the outer tube first end to the outer tube second end. The outer tube may define an interior. The strut also may include an additively manufactured inner tube at least partially within the interior of the outer tube of the strut. The additively manufactured inner tube defines an additively manufactured inner tube first end and an additively manufactured inner tube second end. The additively manufactured inner tube first end is integrally joined to the outer tube proximate to the outer tube first end.

19 Claims, 8 Drawing Sheets

DOUBLE WALL TUBES USING ADDITIVE MANUFACTURING

TECHNICAL FIELD

The disclosure relates to additive manufacturing techniques and to double-walled tubes.

BACKGROUND

Gas turbine engines include a core engine, which includes at least one compressor, a combustor, and at least one turbine. The core engine may be supported in an engine casing, which circumferentially surrounds the core engine. Fluids, such as air, oil, and fuel may be supplied to and/or removed from the core engine to support operation of the core engine. Additionally, the core engine may be supported within the engine casing by an annular support that includes a plurality of struts.

SUMMARY

In some examples, the disclosure describes a strut that includes an outer tube comprising an outer tube first end, an outer tube second end, and a longitudinal axis extending from the outer tube first end to the outer tube second end, wherein the outer tube defines an interior; and an additively manufactured inner tube at least partially within the interior of the outer tube of the strut, wherein the additively manufactured inner tube defines an additively manufactured inner tube first end and an additively manufactured inner tube second end, and wherein the additively manufactured inner tube first end is integrally joined to the outer tube proximate to the outer tube first end.

In some examples, the disclosure describes a gas turbine engine that includes an annular support including: an inner annular portion; an outer annular portion; and a plurality of struts joining the inner annular portion and the outer annular portion, wherein at least one strut of the plurality of struts comprises: an outer tube comprising an outer tube first end, an outer tube second end, and a longitudinal axis extending from the outer tube first end to the outer tube second end, wherein the outer tube defines an interior; and an additively manufactured inner tube at least partially within the interior of the outer tube of the strut, wherein the additively manufactured inner tube defines an additively manufactured inner tube first end and an additively manufactured inner tube second end, and wherein the additively manufactured inner tube first end is integrally joined to the outer tube proximate to the outer tube first end.

The details of one or more examples are set forth in the accompanying drawings and the description below. Other features, objects, and advantages will be apparent from the description and drawings, and from the claims.

DETAILED DESCRIPTION

The disclosure generally describes struts and techniques for forming struts that include double-walled tubes. The struts may be used as mechanical supports for mechanical systems, such as gas turbine engines. For example, the support may include an annular support used to support a core engine or one or more components of a core engine within a casing of a gas turbine engine.

The support may include at least one strut that includes a double-walled tube as described herein. For example, the double-walled tube may join an inner annular portion and an outer annular portion of the annular support. The double-walled tube may provide mechanical support separating the inner and outer annular portions and also may provide a fluid path for one or more fluids to flow through. For instance, the at least one strut may include an outer tube that extends between a first end and a second end and defines an interior. The first end may be attached to the inner annular portion and the second end may be attached to the outer annular portion. The strut also may include an inner tube. At least a portion of the inner tube may be disposed within the interior of the outer tube. A first end of the inner tube may be joined to the outer tube near an end of the outer tube (e.g., the first end of the outer tube). The inner tube may provide a fluid path through which one or more fluids, such as air, oil, a coolant, fuel, or the like, flows.

The inner tube may be additively manufactured such that it is integrally formed with the outer tube. For example, the first end of the inner tube may formed using additive manufacturing with a surface of the outer tube as the build surface. This results in the inner tube being integrally formed with the outer tube, which may reduce a likelihood of failure at the location at which the inner and outer tubes are joined. In the absence of additive manufacturing, this location may be a joint between the inner tube and the outer tube, e.g., a welded joint or a brazed joint. Using additive manufacturing to form an inner tube integrally with an outer tube may reduce probability of damage to the mechanical systems (e.g., gas turbine engine) or components of the mechanical system due to fluid leaks. For instance, in implementations in which the fluid flowing through the inner tube is oil, leaking oil may contact high temperature surfaces or be exposed to high temperature gases. Either of these may result in fires due to combustion of the leaking oil. By reducing failure between the inner and outer tube and reducing probability of leaks, the strut described herein may reduce probability of fires within the mechanical system. Additionally, or alternatively, additive manufacturing of the inner tube may simplify manufacture of the strut, e.g., by eliminating brazing steps and potentially eliminating support structures, such as bosses, that facilitate brazing.

Figure 1:
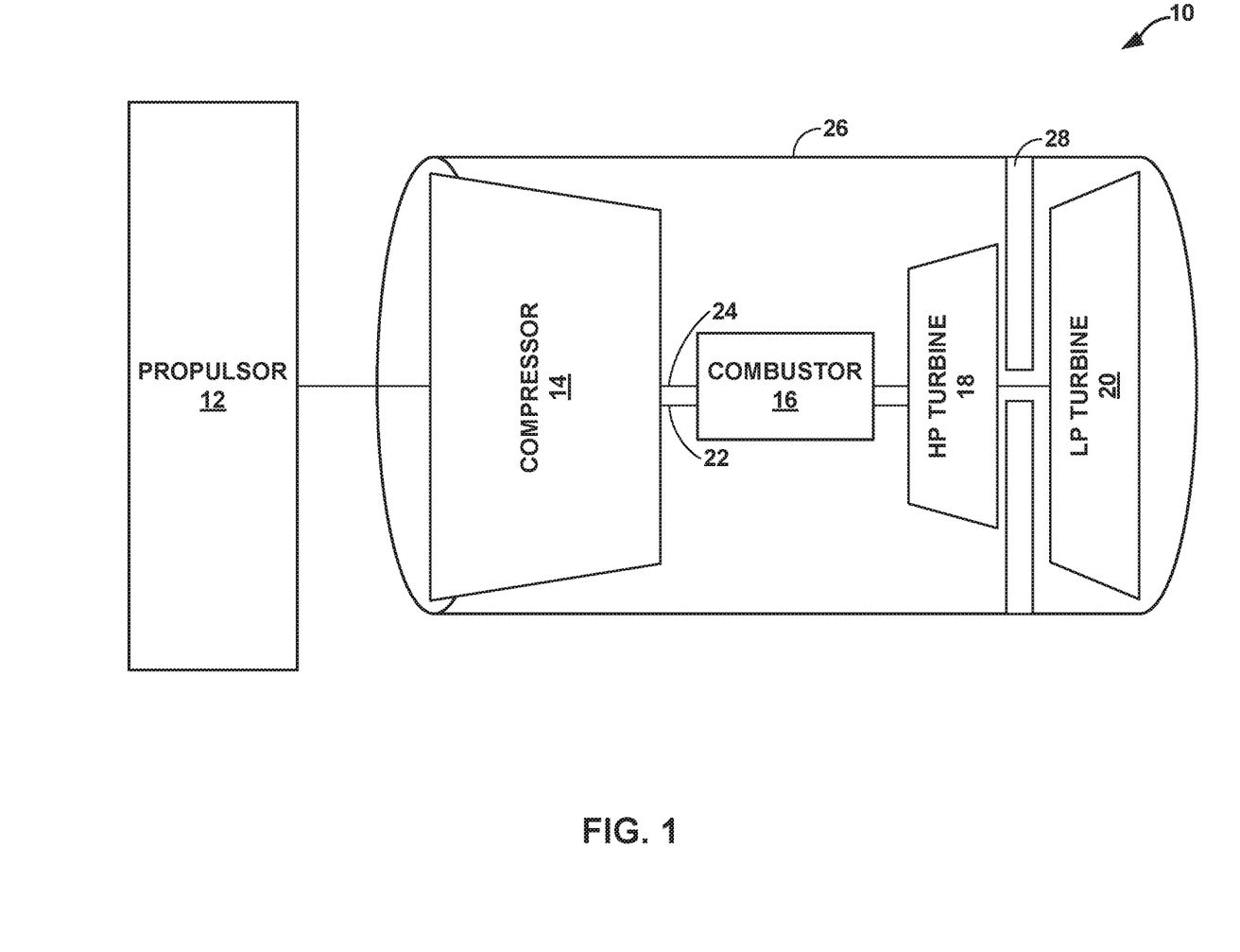
FIG. 1 is a conceptual diagram illustrating an example gas turbine engine that includes an annular support that includes at least one strut including a dual walled tube, in accordance with one or more aspects of the present disclosure.

FIG. 1 is a conceptual diagram illustrating an example gas turbine engine 10 that includes an annular support 28 that includes at least one strut including a dual walled tube, in accordance with one or more aspects of the present disclosure. Although annular support 28 is illustrated between HP turbine 18 and LP turbine 20, annular support 28 may be positioned at any other location within gas turbine engine 10, e.g., any other location along the axis of gas turbine engine 10 at which annular support 28 may support a rotating component, or at another location within gas turbine engine 10 where annular support 28 supports another (non-rotating) component. For instance, annular support 28 may be aft or LP turbine 20, fore of compressor 14, or the like, and/or gas turbine engine 10 may include multiple annular supports 28.

Gas turbine engine 10 is a primary propulsion engine that provides shaft horsepower for operations of a vehicle, such as an aircraft, marine vehicle, or the like. In some examples, gas turbine engine 10 is a two-spool engine having a low pressure (LP) spool that includes a low pressure (LP) turbine 20, a lower pressure (LP) shaft 24, and a propulsor 12, and a high pressure (HP) spool that includes a compressor 14, a high pressure shaft 22, and a high pressure (HP) turbine 18. In other examples, gas turbine engine 10 may include a single spool or three or more spools, e.g., may include an intermediate pressure (IP) spool and/or other spools. In some examples, gas turbine engine 10 may include any suitable turbine or electrically powered-engine propulsion system, including but not limited to, a turboprop engine, a turbo fan engine, or a turboshaft engine (including rotary wing aircraft).

Gas turbine engine 10 includes compressor 14, a combustor 16, HP turbine 18, and LP turbine 20, each of which is fluidically disposed in series with respect to one another as shown in the example of FIG. 1. That is, air enters compressor 14, which produces first stage compressed air that is directed into combustor 16.

Combustor 16 is fluidically disposed between compressor 14 and HP turbine 18, and as such is in series flow downstream from compressor 14. In some examples, combustor 16 includes a combustion liner (not shown) that encloses a continuous combustion process using the compressed air and fuel. In other examples, combustor 16 may take other forms, and may be, for example, a wave rotor combustion system, a rotary valve combustion system, a pulse detonation combustion system, or a slinger combustion system, and may employ deflagration and/or detonation combustion processes. Combustor 16 outputs the result of burning the fuel as hot expanding gases.

HP turbine 18 is fluidically disposed between combustor 16 and LP turbine 20, and as such is in series flow downstream of combustor 18. HP turbine 18 utilizes the hot expanding gases to drive the HP spool, which in turn drives compressor 14. The hot expanding gases pass through HP turbine 18 to LP turbine 20, thereby driving LP shaft 24. LP shaft 24 may be coupled to a gearbox or device, which provides mechanical energy to drive propulsor 12. Propulsor 12 provides thrust, lift, and/or rotational control for the vehicle.

Compressor 14 includes one or more compressor stages. Each compressor stage may include a compressor stator vane row along the axial circumference of gas turbine engine 10 and a compressor rotor (which may refer to compressor blades attached along an axial circumference of a rotor disc), both of which are not shown for ease of illustration purposes in the example of FIG. 1. The compressor rotors for compressor 14 are spun between the compressor stator vane rows of compressor 14 via HP shaft 22 to produce the compressed air.

Each of HP turbine 18 and LP turbine 20 include one or more turbine stages. Each turbine stage may include a stator vane row along the axial circumference of gas turbine engine 10 and a turbine rotor (which may refer to turbine blades attached along an axial circumference of a rotor disc), both of which again are not shown in the example of FIG. 1 for ease of illustration purposes. The gas emitted by combustor 16 drives the turbine rotors of HP turbine 18 and LP turbine 20, which spin between the respective stator vane rows of HP turbine 18 and LP turbine 20. The rotation or spinning drives respective HP shaft 22 and LP shaft 24, which as noted above drive compressor 14 and propulsor 12.

Gas turbine engine 10 also includes a casing 26 surrounding or otherwise forming portions of compressor 14, combustor 16, HP turbine 18, LP turbine 20 and possibly other components of gas turbine engine 10 that are not shown for ease of illustration in the example of FIG. 1. For example, the above noted compressor stator vane rows may be affixed to casing 26. Likewise, the turbine stator vane rows may be affixed to casing 26.

To support operation of the core of gas turbine engine 10 (e.g., including compressor 14, combustor 16, and/or turbines 18 and 20), fluids may be transferred between locations near casing 26 and locations near HP shaft 22 and LP shaft 24 (e.g., radially inward and/or outward with respect to HP shaft 22 and LP shaft 24). The fluids may include, for example, air, oil, coolant, fuel, or the like. Additionally, components of the core are supported in casing 26 and separated from casing 26. In accordance with aspects of the disclosure, gas turbine engine 10 includes an annular support 28 that supports components of the core within casing 26 and enables flow of fluids through annular support 28.

Annular support 28 may include, for example, a first support portion, a second support portion, and at least one strut that joins the first support portion and the second support portion. For instance, in the example of FIG. 1, in which annular support 28 supports one or more components of a core engine within casing 26, the first support portion may include an inner annular structure and the second support portion may include an outer annular structure. The least one strut includes an outer tube and an inner tube. The outer tube may include an outer tube first end, an outer tube second end, and may define a longitudinal axis extending from the outer tube first end to the outer tube second end. The outer tube defines an interior in which an additively manufactured inner tube is at least partially disposed. The additively manufactured inner tube defines an additively manufactured inner tube first end and an additively manufactured inner tube second end. At least the additively manufactured inner tube first end is integrally joined to the outer tube proximate to the outer tube first end.

Using additive manufacturing to form an inner tube integrally with an outer tube may reduce probability of damage to the mechanical systems (e.g., gas turbine engine 10) or components of the mechanical system due to fluid leaks. For instance, in implementations in which the fluid flowing through the inner tube is oil, leaking oil may contact high temperature surfaces of gas turbine engine 10 or be exposed to high temperature working gases within gas turbine engine 10. Either of these may result in fires due to combustion of the leaking oil. By reducing failure between the inner and outer tube and reducing probability of leaks, the strut described herein may reduce probability of fires within the mechanical system. Additionally, or alternatively, additive manufacturing of the inner tube may simplify manufacture of the strut, e.g., by eliminating brazing steps and potentially eliminating support structures, such as bosses, that facilitate brazing.

Figure 2:
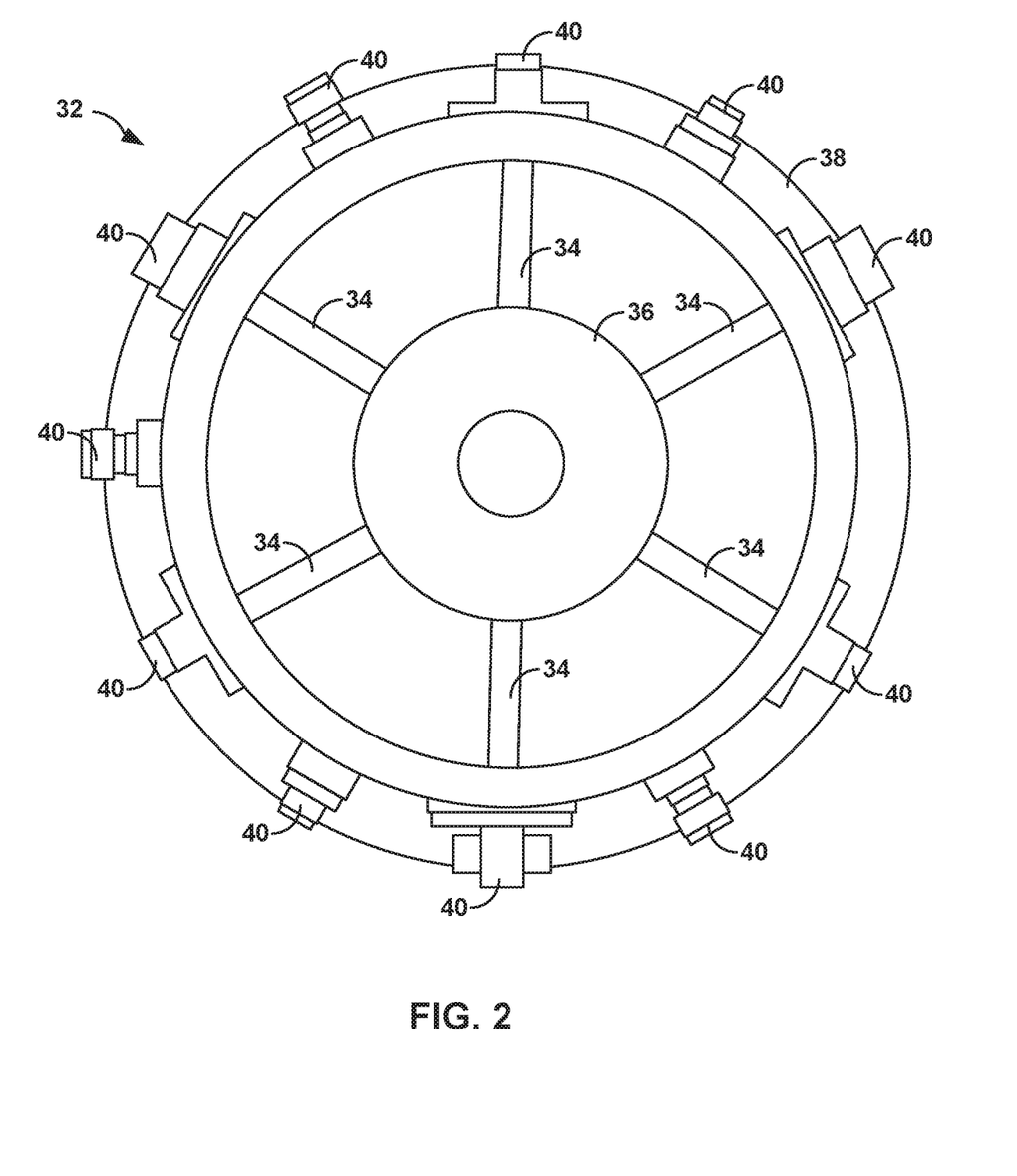
FIG. 2 is a conceptual diagram illustrating an example annular support that includes a plurality of struts.

FIG. 2 shows an example of annular support 28 of FIG. 1. In particular, FIG. 2 is a conceptual diagram illustrating an example annular support 32 that includes a plurality of struts 34. Plurality of struts 34 join an inner annular portion 36 and an outer annular portion 38 of annular support 32. At least one strut of plurality of struts 34 may enable flow of fluid through the strut from outer annular portion 38 to inner annular portion 36 and/or vice versa. In the example, of FIG. 2, each strut of the plurality of struts 34 enables flow of fluid through the strut from outer annular portion 38 to inner annular portion 36 and/or vice versa, as illustrated by the plurality of fittings 40 connected to outer annular portion 38. In other examples, fewer than all of the plurality of struts 34 enable flow of fluid through the strut from outer annular portion 38 to inner annular portion 36 and/or vice versa. Although FIG. 2 illustrates an annular support 32, in other examples, the support joined by a double tube strut described herein may have another form, such as a support with two portions of any shape joined by one or more double tube struts. The two portions may be selected from linear, curved, segmented, or curvilinear shapes.

Annular support 28, including struts 34, inner annular portion 36, and outer annular portion 38 may be formed from any suitable material. For instance, struts 34, inner annular portion 36, and outer annular portion 38 may be formed from any suitable metal or alloy, including those suitable for forming an additively manufactured component. In some examples, the metal or alloy includes a high-performance metal or alloy for forming component used in mechanical systems, such as a steel (e.g., stainless steel), a nickel-based alloy, a cobalt-based alloy, a titanium-based alloy, or the like. In some examples, the metal or alloy powder may include a nickel-based, iron-based, or titanium-based alloy that includes one or more alloying additions such as one or more of Mn, Mg, Cr, Si, Co, W, Ta, Al, Ti, Hf, Re, Mo, Ni, Fe, B, Nb, V, C, and Y. In some examples, the metal or alloy may include a polycrystalline nickel-based superalloy or a polycrystalline cobalt-based superalloy, such as an alloy including NiCrAlY or CoNiCrAlY. For example, the metal or alloy may include an alloy that includes 9 to 10.0 wt. % W, 9 to 10.0 wt. % Co, 8 to 8.5 wt. % Cr, 5.4 to 5.7 wt. % Al, about 3.0 wt. % Ta, about 1.0 wt. % Ti, about 0.7 wt. % Mo, about 0.5 wt. % Fe, about 0.015 wt. % B, and balance Ni, available under the trade designation MAR-M-247, from MetalTek International, Waukesha, Wis. In some examples, the metal or alloy may include an alloy that includes 22.5 to 24.35 wt. % Cr, 9 to 11 wt. % Ni, 6.5 to 7.5 wt. % W, less than about 0.55 to 0.65 wt. % of C, 3 to 4 wt. % Ta, and balance Co, available under the trade designation MAR-M-509, from MetalTek International. In some examples, the metal or alloy may include an alloy that includes 19 to 21 wt. % Cr, 9 to 11 wt. % Ni, 14 to 16 wt. % W, about 3 wt. % Fe, 1 to 2 wt. % Mn, and balance Co, available under the trade designation L605, from Rolled Alloys, Inc., Temperance, Mich. In some examples, t metal or alloy may include a chemically modified version of MAR-M-247 that includes less than 0.3 wt. % C, between 0.05 and 4 wt. % Hf, less than 8 wt. % Re, less than 8 wt. % Ru, between 0.5 and 25 wt. % Co, between 0.0001 and 0.3 wt. % B, between 1 and 20 wt. % Al, between 0.5 and 30 wt. % Cr, less than 1 wt. % Mn, between 0.01 and 10 wt. % Mo, between 0.1 and 20. % Ta, and between 0.01 and 10 wt. % Ti. In some examples, the metal or alloy may include a nickel based alloy available under the trade designation IN-738 or Inconel 738, or a version of that alloy, IN-738 LC, available from All Metals & Forge Group, Fairfield, N.J., or a chemically modified version of IN-738 that includes less than 0.3 wt. % C, between 0.05 and 7 wt. % Nb, less than 8 wt. % Re, less than 8 wt. % Ru, between 0.5 and 25 wt. % Co, between 0.0001 and 0.3 wt. % B, between 1 and 20 wt. % Al, between 0.5 and 30 wt. % Cr, less than 1 wt. % Mn, between 0.01 and 10 wt. % Mo, between 0.1 and 20 wt. % Ta, between 0.01 and 10 wt. % Ti, and a balance Ni. In some examples, the metal or alloy may include may include an alloy that includes 5.5 to 6.5 wt. % Al, 13 to 15 wt. % Cr, less than 0.2 wt. % C, 2.5 to 5.5 wt. % Mo, Ti, Nb, Zr, Ta, B, and balance Ni, available under the trade designation IN-713 from MetalTek International, Waukesha, Wis. In some examples, the metal or alloy may include may include an alloy that includes 50 to 55 wt. % Ni plus Co, 17 to 21 wt. % Cr, 4.75 to 5.5 wt. % Nb plus Ta, 2.8 to 3.3 wt. % Mo, 0.65 to 1.15 wt. % Ti, 0.2 to 0.8 wt. % Al, less than 1 wt. % Co, less than 0.08 wt. % C, less than 0.35 wt. % Mn, less than 0.35 wt. % Si, less than 0.015 wt. % P, less than 0.015 wt. % S, less than 0.006 wt. % B, less than 0.3 wt. % Cu, and a balance Fe, available under the trade designation IN-718 from MetalTek International, Waukesha, Wis. In some examples, the metal or alloy may include may include a titanium alloy referred to as Ti-6Al-4V. In some examples, the metal or alloy may include a refractory metal or a refractory metal alloy, such as molybdenum or a molybdenum alloy (such as a titanium-zirconium-molybdenum or a molybdenum-tungsten alloy), tungsten or a tungsten alloy (such as a tungsten-rhenium alloy or an alloy of tungsten and nickel and iron or nickel and copper), niobium or a niobium alloy (such as a niobium-hafnium-titanium alloy), tantalum or a tantalum alloy, rhenium or a rhenium alloy, or combinations thereof.

Figure 3:
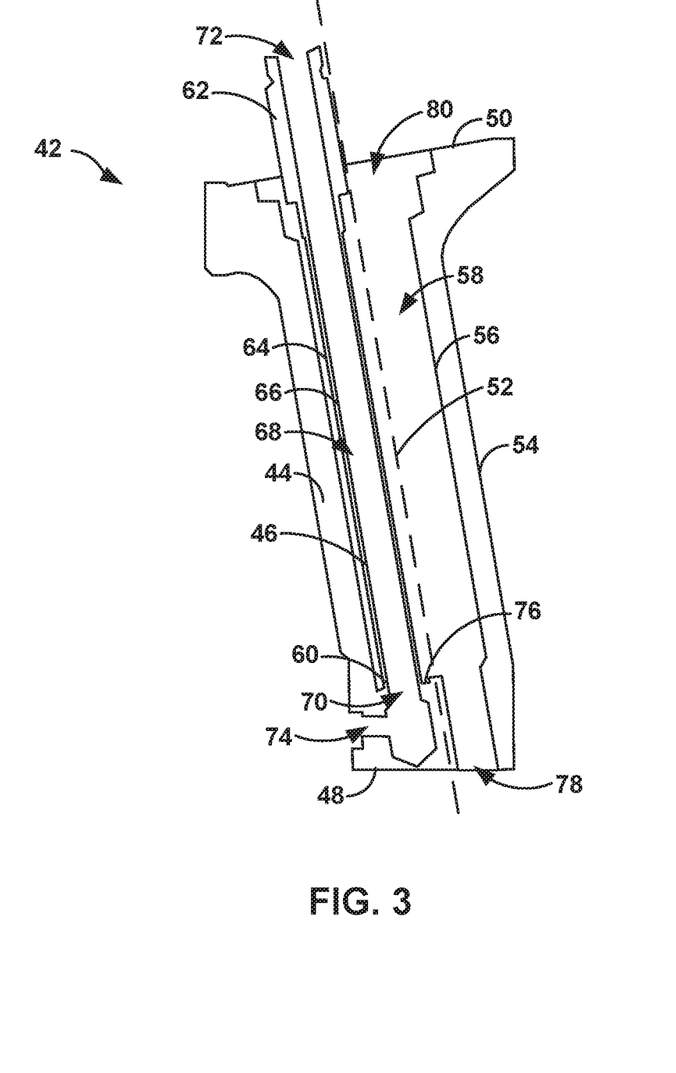
FIG. 3 is a conceptual diagram illustrating an example strut that includes a double-walled tube.

FIG. 3 is a conceptual diagram illustrating an example strut 42 that includes a double-walled tube. Strut 42 may be an example of struts 34 of FIG. 2 and/or the struts described with reference to annular support 28 of FIG. 1. Strut 42 includes an outer tube 44 and an inner tube 46. Outer tube 44 extends from a first end 48 to a second end 50 and defines a longitudinal axis 52 extending from first end 48 to second end 50. In the example of FIG. 3, outer tube 44 extends substantially linearly in the direction of longitudinal axis 52, while in other examples, outer tube 44 may define any linear, curved, curvilinear, or segmented shape. Each segment of a segmented shape may be linear, curved, or curvilinear.

Outer tube 44 defines an outer surface 54 and an inner surface 56. Each of outer surface 54 and inner surface 56 may define any cross-sectional shape in a plane orthogonal to longitudinal axis 52, and the cross-sectional shapes of outer surface 54 and inner surface 56 may be the same or different. Additionally, the cross-sectional shapes of outer surface 54 and inner surface 56 may be consistent along the length of longitudinal axis 52 or may change along the length of longitudinal axis 52. Suitable cross-sectional shapes include circular, elliptical, polygonal (e.g., quadrilateral), rounded polygonal (e.g., polygonal with rounded rather than sharp vertices), or more complex shapes, such as that shown in FIG. 7 below. Inner surface 56 of outer tube 44 defines an interior 58 of outer tube 44.

Outer tube 44 also defines a first opening 78 near or at first end 48 and a second opening 80 at or near second end 50. First and second openings 78 and 80 fluidly communicate with interior 58 of outer tube 44 to define an optional flow path through inner tube 44 from first end 48 to second end 50 or vice/versa.

Inner tube 46 is positioned at least partially within interior 58 of outer tube 44. Inner tube 46 extends from a first end 60 to a second end 62. One or both of first end 60 or second end 62 is integrally formed with outer tube 44, e.g., using additive manufacturing. In some examples, one of first end 60 or second end 62 is integrally formed with outer tube 44 and the other of first end 60 or second end 62 is not directly attached to outer tube 44. In some examples, as shown in FIG. 3, a portion of inner tube 46 extends out of the interior 58 of outer tube 44, e.g., first end 60 may be integrally formed with outer tube 44 and second end 62 may extend out of the interior 58 of outer tube 44.

In some examples, inner tube 46 extends substantially parallel to longitudinal axis 52, as shown in FIG. 3. In other examples, inner tube 46 may extend non-parallel to longitudinal axis 52, e.g., non-parallel to outer tube 44. Inner tube 46 may extend substantially linearly in the direction of longitudinal axis 52, or may define any linear, curved, curvilinear, or segmented shape. Each segment of a segmented shape may be linear, curved, or curvilinear.

Inner tube 46 defines an outer surface 64 and an inner surface 66. Each of outer surface 64 and inner surface 66 may define any cross-sectional shape in a plane orthogonal to longitudinal axis 52, and the cross-sectional shapes of outer surface 64 and inner surface 66 may be the same or different. Additionally, the cross-sectional shapes of outer surface 64 and inner surface 66 may be consistent along the length of inner tube 46 or may change along the length of inner tube 46. The cross-sectional shape of inner tube 46 at a position along longitudinal axis 52 may be the same or different from the cross-sectional shape of outer tube 44 at the same position along longitudinal axis 52. Suitable cross-sectional shapes include circular, elliptical, polygonal (e.g., quadrilateral), rounded polygonal (e.g., polygonal with rounded rather than sharp vertices), or more complex shapes, such as that shown in FIG. 7 below. Inner surface 66 of inner tube 46 defines an interior 68 of inner tube 46 through which fluid may flow.

As shown in FIG. 3, inner tube 46 includes a first opening 70 at first end 60 and a second opening 72 at second end 62. First and second openings 70 and 72 fluidly communicate with interior 68 of inner tube 46 to define a flow path through inner tube 46 from first end 60 to second end 62. As shown in FIG. 3, in some examples in which first end 60 is integrally formed with outer tube 44, first opening 70 is fluidly connected to an opening 74 defined in outer tube 44 to allow fluid flow into and/or out of strut 42.

Inner tube 46 is integrally formed with outer tube 44. For example, inner tube 46 may be additively manufactured within outer tube 44, with surface 76 of outer tube 44 defining the build surface on which inner tube 46 is additively manufactured. As another example, outer tube 44 and inner tube 46 may be additively manufactured as a single piece.

In some examples, inner tube 46 may be coupled to outer tube 44 only at or near first end 60 of outer tube 44. For example, second end 62 of outer tube 44 may not be directly attached to outer tube 44. This may allow relative movement between a majority (e.g., greater than half) or substantially all (e.g., all except for first end 60) of inner tube 46 relative to outer tube 44. Relative movement may be due to thermal expansion and contraction (e.g., due to temperature differences and/or material differences between inner tube 46 and outer tube 44), mechanical forces (e.g., vibration), or the like. Allowing relative movement may reduce a likelihood of cracking of inner tube 46 and/or cracking where inner tube 46 and outer tube 44 are integrally formed.

Using additive manufacturing to form inner tube 46 integrally with outer tube 44 may reduce probability of damage to the mechanical systems (e.g., gas turbine engine 10) or components of the mechanical system due to fluid leaks. For instance, in implementations in which the fluid flowing through interior 68 of inner tube 46 is oil, leaking oil may contact high temperature surfaces of gas turbine engine 10 or be exposed to high temperature working gases within gas turbine engine 10. Either of these may result in fires due to combustion of the leaking oil. By reducing failure between the inner tube 46 and outer tube 44 and reducing probability of leaks, strut 42 may reduce probability of fires within the mechanical system. Additionally, or alternatively, additive manufacturing of inner tube 46 and, optionally, outer tube 44, may simplify manufacture of strut 42, e.g., by eliminating brazing steps and potentially eliminating support structures, such as bosses, that facilitate brazing.

Figure 4:
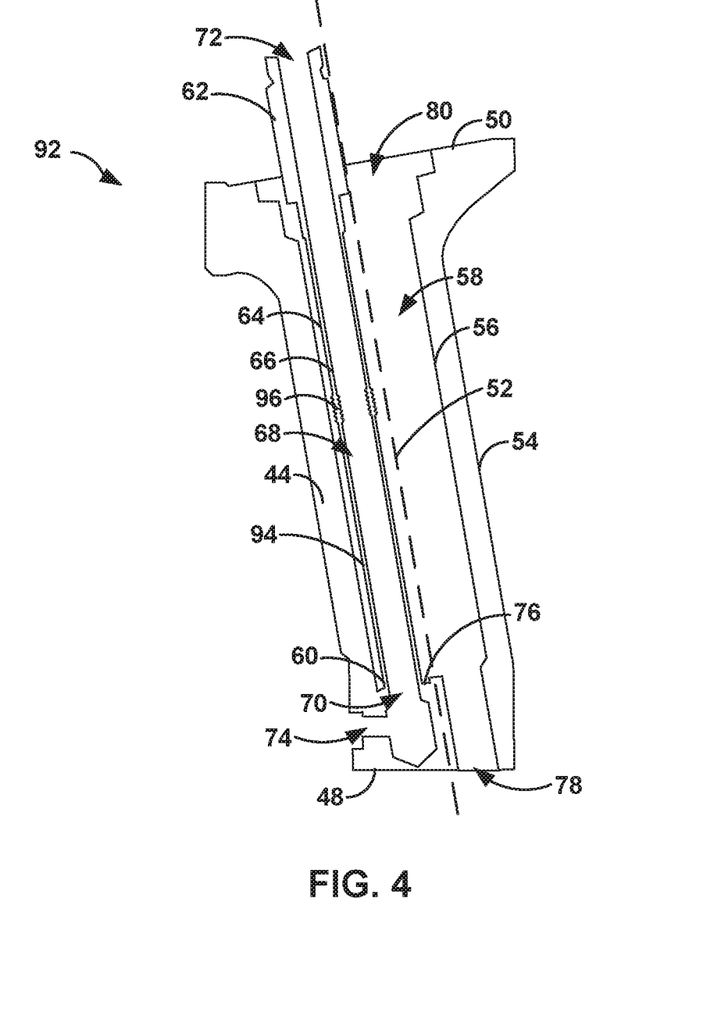
FIG. 4 is a conceptual diagram illustrating another example strut that includes a double-walled tube.

In some examples, an inner tube may include additional structural features that accommodate thermal expansion and contraction differences between different components. For example, FIG. 4 is a conceptual diagram illustrating another example strut 92 that includes a double-walled tube, and includes an inner tube 94 including at least one portion 96 configured to preferentially deform in the direction of the longitudinal axis of the inner tube 94. Strut 92 may be similar to or substantially the same as strut 42 shown in FIG. 3, aside from the differences described herein.

Unlike strut 42, strut 92 includes an inner tube 94 including at least one deformable portion 96 configured to preferentially deform in the direction of the longitudinal axis of the inner tube 94. At least one deformable portion 96 may be formed integrally with (e.g., additively manufactured as part of) inner tube 94. For instance, at least one deformable portion 96 may include a bellows-like structure of alternating ridges and valleys, may include a portion of inner tube 94 having a thinner wall, a curved wall portion (like a surface of a sphere or a portion of a sphere), or another structure that deforms more easily in the direction of longitudinal axis 52 than surrounding portions of inner tube 94. In any case, at least one deformable portion 96 may facilitate longitudinal expansion or contraction of inner tube 94. This may be beneficial when second end 72 of inner tube 94 is coupled to another component, e.g., to enable fluid flow through strut 92 to and/or from the other component. Second end 72 of inner tube 94 may be retained relative to the other component, and the other component may move relative to strut 92, e.g., due to vibration, thermal expansion or contraction, or the like. By facilitating dimensional changes of inner tube 94 along longitudinal axis 52, at least one deformable portion 96 may help reduce likelihood of damage, such as cracks, to inner tube 94 and/or at the location at which inner tube 94 attaches to outer tube 44.

Figure 5:
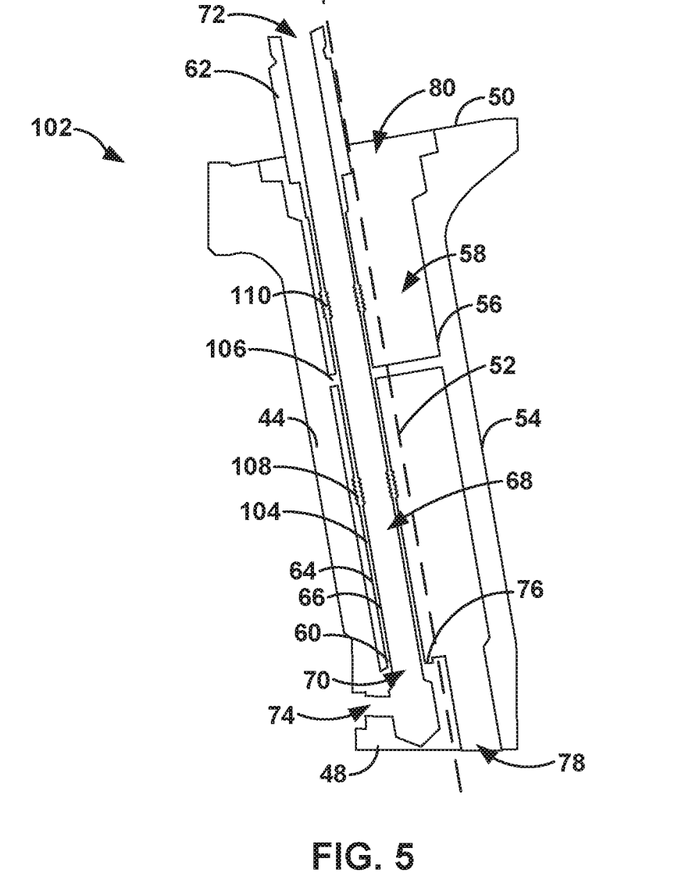
FIG. 5 is a conceptual diagram illustrating another example strut that includes a double-walled tube.

In some examples, a strut may include a dual-walled tube that includes a lateral support between an inner tube and an outer tube. Such a lateral support may reduce lateral or transverse motion between the inner tube and the outer tube, which may reduce stress at points where the inner tube and outer tube are integrally formed. For example, FIG. 5 is a conceptual diagram illustrating another example strut 102 that includes a double-walled tube. Strut 102 may be similar to or substantially the same at strut 42 shown in FIG. 3 and strut 92 shown in FIG. 4, aside from the differences described herein.

Unlike strut 42 and strut 92, strut 102 includes a lateral support 106 joining an outer tube 44 and inner tube 104 at a location between first end 60 of inner tube 104 and second end 62 of inner tube 104. Lateral support 106 joins outer surface 64 of inner tube 104 to inner surface 56 of outer tube 44. Lateral support 106 reduces or substantially eliminates lateral motion (e.g., motion in a direction substantially orthogonal to longitudinal axis 52 at the position along the longitudinal axis at which lateral support 106 is located.

Lateral support 106 may be integrally formed with inner tube 104 and/or outer tube 44. For instance, lateral support 106 may be additively manufactured with inner tube 104 and/or outer tube 44.

Lateral support 106 may be located at any position along inner tube 104 (e.g., along longitudinal axis 52). In some examples, lateral support 106 may be located at about a mid-point of the length of inner tube 104 as measured along longitudinal axis 52 (e.g., within 10% of the length of inner tube 104 from a mid-point of the length of inner tube 104). In some instances, lateral support 106 may not be substantially rigid, e.g., may include one or more features or properties that allow lateral support 106 to flex parallel to axis 52 and/or transverse to axis 52. For example, lateral support 106 may be oriented at a non-orthogonal angle to axis 52, such that lateral support 106 is oriented at a non-orthogonal angle to inner tube 104 and outer tube 44. As another example, lateral support 106 may include a bellows or spring structure to provide flexibility to lateral support 106, or may be formed from a material and/or thickness that allows inherent flexibility of lateral support 106.

FIG. 5 illustrates an example strut that includes a single lateral support 106. In other examples, lateral support 106 may include a plurality of lateral supports 106 (e.g., at least two lateral supports 106).

Lateral support 106 may be formed from any suitable material. In some examples, lateral support 106 may be formed form the same material as inner tube 104 to reduce or substantially eliminate differences in thermal expansion or contraction between inner tube 104 and lateral support 106.

Lateral support 106 may constrain dimensional changes of inner tube 104 in the direction of longitudinal axis 52. As such, in some implementations, inner tube 104 may include at least one deformable portion 108, 110 configured to preferentially deform in the direction of longitudinal axis 52 of inner tube 104. For instance, inner tube 104 may include a deformable portion for each segment of inner tube 104. In the example of FIG. 5, inner tube 104 includes two deformable portions 108, 110. First deformable portion 108 is part of a first segment of inner tube 104 between first end 60 and lateral support 106. Second deformable portion 110 is part of a second segment of inner tube 104 between lateral support 106 and second end 62. Each of deformable portions 108, 110 may be formed integrally with (e.g., additively manufactured as part of) inner tube 104.

Each of deformable portions 108, 110 may have the same configuration (e.g., bellows-like structure, a thinner wall, a curved wall portion) or they may have different configurations. In any case, each deformable portion 108, 110 may facilitate longitudinal expansion or contraction of the segment of inner tube 104 of which the deformable portion 108, 110 is part. As such, first deformable portion 108 may allow dimensional changes of inner tube 104 along longitudinal axis 52 while inner tube 104 is constrained at first end 60 and lateral support 106. Similarly, second deformable portion 110 may allow dimensional changes of inner tube 104 along longitudinal axis 52 while inner tube 104 is constrained at lateral support 106 and second end 62. The example strut 102 of FIG. 5 may reduce stress at first end 60 of inner tube 104 by reducing transverse movement of inner tube 104 relative to outer tube 44 due to lateral support 106 while allowing longitudinal dimensional changes of inner tube 104 due to deformable portions 108 and 110. As such, lateral support 106 and deformable portions 108 and 110 may help reduce cracking at first end 60 and leaks of fluid out of inner tube 104.

Figure 6:
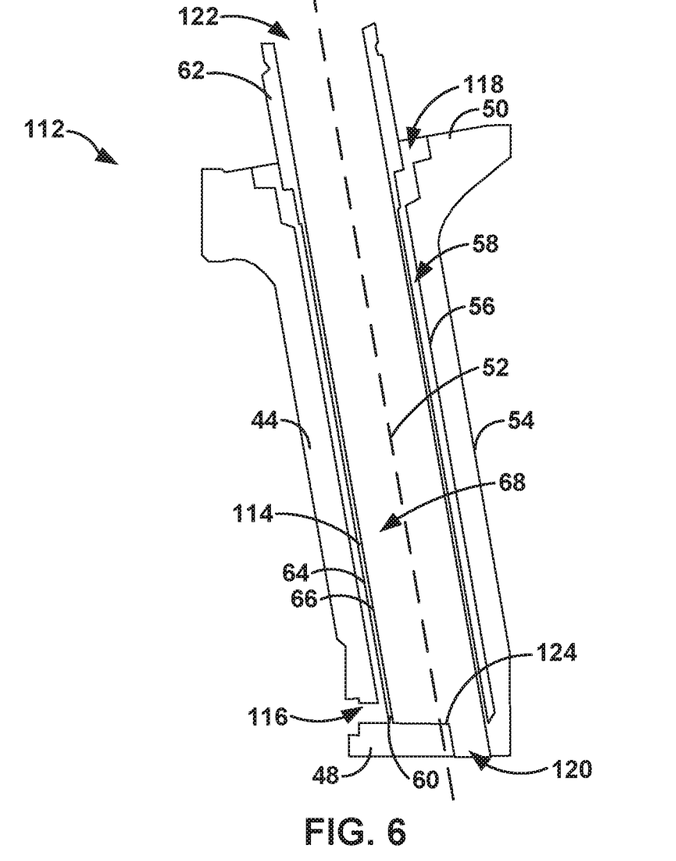
FIG. 6 is a conceptual diagram illustrating another example strut that includes a double-walled tube.
Figure 7:
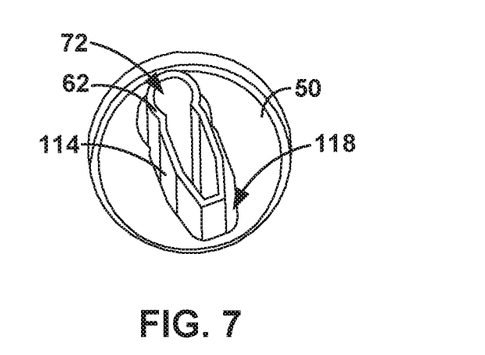
FIG. 7 is a perspective diagram illustrating the example strut of FIG. 6.

The inner tube and outer tube of the strut may have any suitable cross-sectional shape in a plane orthogonal (e.g., perpendicular) to longitudinal axis 52, including circular, elliptical, oval, polygonal, rounded polygonal (e.g., polygonal with rounded vertices rather than pointed vertices), or other, more complex shapes such as airfoils. For instance, FIG. 6 is a conceptual diagram illustrating another example strut 112 that includes a double-walled tube with a more complex cross-sectional shape. FIG. 7 is a perspective diagram illustrating the example strut 112 of FIG. 6. Strut 112 may be similar to or substantially the same at strut 42 shown in FIG. 3, strut 92 shown in FIG. 4, or strut 102 shown in FIG. 5, aside from the differences described herein.

Strut 112 includes outer tube 44 and inner tube 114. Each of inner tube 114 and outer tube 44 includes a non-circular cross-sectional shape in the direction orthogonal to longitudinal axis 52. The cross-sectional shape is shown in FIG. 7. In some instances, outer surface 54 of strut 112 may define a cross-sectional shape defined by function and configuration of strut 112 and the support of which strut 112 is a part. In some implementations, the cross-sectional shape of inner surface 56 may correspond to (e.g., be substantially the same shape as) the cross-sectional of outer surface 54. Similarly, in some implementations, the cross-sectional shape of outer surface 64 of inner tube 114 may correspond to (e.g., be substantially the same shape as) the cross-sectional shape of inner surface 56 of outer tube 44, and the cross-sectional shape of inner surface 66 of inner tube 114 may correspond to (e.g., be substantially the same shape as) the cross-sectional shape of outer surface 64. This may maximize the volume of interior 68 of inner tube 114 to allow flow of fluid through inner tube 114 from first opening 120 adjacent first end 60 to second opening 122 adjacent second end 62 or vice versa.

Additionally, as shown in FIG. 6, outer tube 44 may also define a flow path from first opening 116 adjacent to first end 48 to second opening 118 adjacent second end 50. This may allow flow of a second fluid through strut 112, increasing functionality of strut 112.

Although not shown in FIGS. 6 and 7, strut 112 may include at least one deformable portion as shown in FIGS. 4 and 5 and/or at least one lateral support as shown in FIG. 5.

Figure 8:
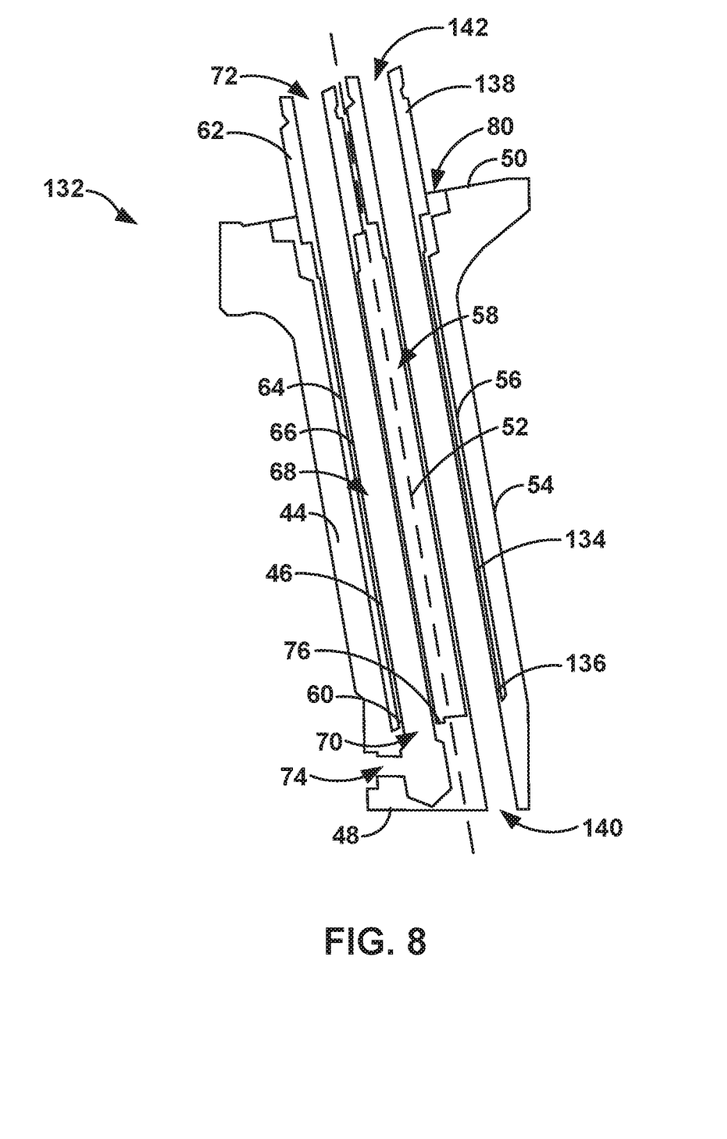
FIG. 8 is a conceptual diagram illustrating an example strut that includes a double-walled tube and two parallel inner tubes.

In some instances, it may be desirable to have additional fluid flows through a strut. In some such examples, a strut may include multiple inner tubes within a single outer tube. FIG. 8 is a conceptual diagram illustrating an example strut 132 that includes a double-walled tube including an outer tube 44 and two parallel inner tubes 46 and 134. First and second inner tubes 46 and 134 are disposed in parallel (e.g., next to each other) within interior 58 of outer tube 44. First and second inner tubes 46 and 134 may be similar or different, e.g., in material, diameter, wall thickness, positioning, or the like. The characteristics of first and second inner tubes 46 and 134 may be selected based on the purpose for first and second inner tubes 46 and 134, e.g., the type and pressure of fluid flowing through the inner tube. As shown in FIG. 8, second inner tube 134 extends from a first end 136 integrally formed with outer tube 44 to a second end 138. Further, second inner tube 134 defines a flow path that extends from a first opening 140 to a second opening 142. Although first and second openings 140 and 142 are positioned at opposite ends of outer tube 44 in the example of FIG. 8, in other examples, each of first and second openings 140 and 142 may be independently positioned at any desired location along second tube 134. Similarly, first and second openings 70 and 72 of first tube 46 may be independently positioned at any desired location along first tube 46. By including two inner tubes 46 and 134, additional fluids may flow through strut 132, increasing functionality of strut 132.

Figure 9:
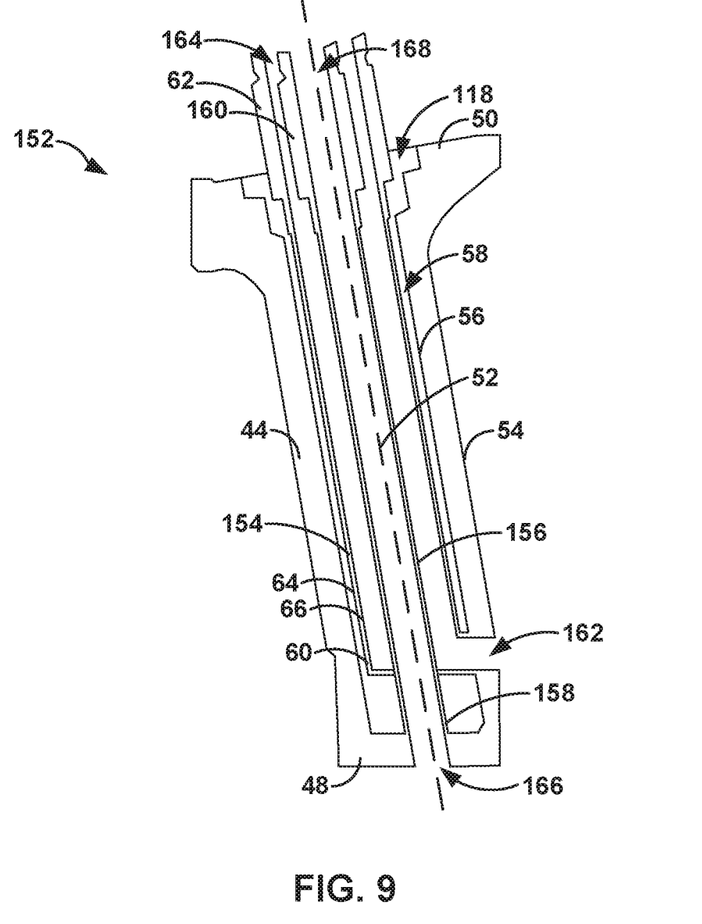
FIG. 9 is a conceptual diagram illustrating an example strut that includes a double-walled tube and two concentric inner tubes.

As another example, a strut may include concentric inner tubes. FIG. 9 is a conceptual diagram illustrating an example strut 152 that includes a double-walled tube including an outer tube 44 and two concentric inner tubes 154 and 156. First and second inner tubes 154 and 156 may be similar or different, e.g., in material, diameter, wall thickness, positioning, or the like. The characteristics of first and second inner tubes 154 and 156 may be selected based on the purpose for first and second inner tubes 154 and 156, e.g., the type and pressure of fluid flowing through the inner tube. As shown in FIG. 9, first inner tube 154 extends from a first end 60 integrally formed with outer tube 44 to a second end 62. Further, first inner tube 154 defines a flow path that extends from a first opening 162 to a second opening 164. First opening 162 is positioned at in a wall of outer tube 44. In other examples, each of first opening 162 may be positioned at any desired location along outer 44. Similarly, first and second openings 166 and 168 of second tube 156 may be independently positioned at any desired location along second tube 156. By including two inner tubes 154 and 156, additional fluids may flow through strut 152, increasing functionality of strut 152.

The inner tube and, optionally, the outer tube may be formed using additive manufacturing. Any suitable additive manufacturing system and technique may be used to form the inner tube and, optionally, the outer tube. For example, fused filament fabrication, stereolithography, powder bed deposition, blown powder deposition, directed energy deposition, or the like may be used to form the inner tube and, optionally, the outer tube.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. An annular support comprising:
an inner annular portion;
an outer annular portion; and
a plurality of struts joining the inner annular portion and the outer annular portion, wherein the plurality of struts are radially arranged between the inner annular portion and the outer annular portion, wherein at least one strut in the plurality of struts is configured to enable a flow of fluid through the strut from the inner annular portion to the outer annular portion, or from the outer annular portion to the inner annular portion, and wherein each strut comprises:
an outer tube comprising an outer tube first end, an outer tube second end, and a longitudinal axis extending from the outer tube first end to the outer tube second end, wherein the outer tube defines an interior; and
an additively manufactured inner tube at least partially within the interior of the outer tube of the strut, wherein the additively manufactured inner tube defines an additively manufactured inner tube first end and an additively manufactured inner tube second end, and wherein the additively manufactured inner tube first end is integrally joined to the outer tube proximate to the outer tube first end.

2. The support of claim 1, wherein the additively manufactured inner tube second end is not attached to the outer tube second end.

3. The support of claim 1, wherein the outer tube is additively manufactured together with the additively manufactured inner tube.

4. The support of claim 1, wherein the additively manufactured inner tube comprises at least one deformable portion configured to preferentially deform in the direction of the longitudinal axis.

5. The support of claim 4, wherein the at least one deformable portion comprises a bellows.

6. The support of claim 1, further comprising a lateral support joining the outer tube and the additively manufactured inner tube at a location between the additively manufactured inner tube first end and the additively manufactured inner tube second end.

7. The support of claim 6, wherein the lateral support is additively manufactured together with the additively manufactured inner tube.

8. The support of claim 6, wherein the additively manufactured inner tube comprises a first portion configured to preferentially deform in the direction of the longitudinal axis and a second portion configured to preferentially deform in the direction of the longitudinal axis, wherein the first portion is between the lateral support and the additively manufactured inner tube first end, and wherein the second portion is between the lateral support and the additively manufactured inner tube second end.

9. The support of claim 1, wherein the outer tube defines a non-circular cross-section in a plane perpendicular to the longitudinal axis, and wherein the additively manufactured inner tube defines a cross-section in the plane perpendicular to the longitudinal axis having a substantially similar shape.

10. The support of claim 1, further comprising an inner tube outlet fluidically coupled to an interior of the inner tube and an outer tube outlet fluidically coupled to the interior of the outer tube.

11. The support of claim 1, wherein the inner tube is a first additively manufactured inner tube, further comprising a second additively manufactured inner tube at least partially within the interior of the outer tube of the strut.

12. The support of claim 11, wherein the first additively manufactured inner tube and the second additively manufactured inner tube are parallel.

13. The support of claim 11, wherein the first additively manufactured inner tube and the second additively manufactured inner tube are concentric.

14. A gas turbine engine comprising:
an annular support comprising:
an inner annular portion;
an outer annular portion; and
a plurality of struts joining the inner annular portion and the outer annular portion, wherein the plurality of struts are radially arranged between the inner annular portion and the outer annular portion, wherein at least one strut in the plurality of struts is configured to enable a flow of fluid through the strut from the inner annular portion to the outer annular portion, or from the outer annular portion to the inner annular portion, and wherein each strut comprises:
an outer tube comprising an outer tube first end, an outer tube second end, and a longitudinal axis extending from the outer tube first end to the outer tube second end, wherein the outer tube defines an interior; and
an additively manufactured inner tube at least partially within the interior of the outer tube of the strut, wherein the additively manufactured inner tube defines an additively manufactured inner tube first end and an additively manufactured inner tube second end, and wherein the additively manufactured inner tube first end is integrally joined to the outer tube proximate to the outer tube first end.

15. The gas turbine engine of claim 14, wherein the outer tube is additively manufactured together with the additively manufactured inner tube.

16. The gas turbine engine of claim 14, wherein the additively manufactured inner tube comprises at least one portion configured to preferentially deform in the direction of the longitudinal axis.

17. The gas turbine engine of claim 14, wherein the at least one strut further comprises a lateral support joining the outer tube and the additively manufactured inner tube at a location between the additively manufactured inner tube first end and the additively manufactured inner tube second end.

18. The gas turbine engine of claim 17, wherein the additively manufactured inner tube comprises a first portion configured to preferentially deform in the direction of the longitudinal axis and a second portion configured to preferentially deform in the direction of the longitudinal axis, wherein the first portion is between the lateral support and the additively manufactured inner tube first end, and wherein the second portion is between the lateral support and the additively manufactured inner tube second end.

19. The gas turbine engine of claim 14, wherein the outer tube defines a non-circular cross-section in a plane perpendicular to the longitudinal axis, and wherein the additively manufactured inner tube defines a cross-section in the plane perpendicular to the longitudinal axis having a substantially similar shape.

* * * * *